US005094189A

United States Patent [19]

Aylen et al.

[11] Patent Number: 5,094,189

[45] Date of Patent: Mar. 10, 1992

[54] ANIMAL LITTER CAPABLE OF AGGLOMERATING

[75] Inventors: Peter B. Aylen; Sanford Wise, both of Kamloops, Canada

[73] Assignee: Western Industrial Clay Products, Ltd., Kamloops, Canada

[21] Appl. No.: 674,740

[22] Filed: Mar. 26, 1991

[51] Int. Cl.$^5$ .......... A01K 29/00

[52] U.S. Cl. .......... 119/173

[58] Field of Search .......... 119/173, 171

[56] References Cited

U.S. PATENT DOCUMENTS

| | | | |
|---|---|---|---|
| 3,921,581 | 11/1975 | Brewer | 119/1 |
| 3,923,005 | 12/1975 | Fry et al. | 119/1 |
| 4,009,684 | 3/1977 | Kliment et al. | 119/1 |
| 4,206,718 | 6/1980 | Brewer | 119/1 |
| 4,494,482 | 1/1985 | Arnold | 119/1 |
| 4,638,763 | 1/1987 | Greenberg | 119/1 |
| 4,676,196 | 6/1987 | Lojek | 119/1 |
| 4,685,420 | 8/1987 | Stuart | 119/1 |
| 4,727,824 | 3/1988 | Ducharme et al. | 119/1 |
| 4,844,010 | 7/1989 | Ducharme et al. | 119/1 |
| 4,881,490 | 11/1989 | Ducharme et al. | 119/1 |

FOREIGN PATENT DOCUMENTS

| | | |
|---|---|---|
| 915083 | 11/1972 | Canada . |
| 1015233 | 8/1977 | Canada . |
| 1024499 | 1/1978 | Canada . |

*Primary Examiner*—Gene Mancene
*Assistant Examiner*—Thomas Price
*Attorney, Agent, or Firm*—Beveridge, DeGrandi & Weilacher

[57] ABSTRACT

An animal litter capable of agglomerating in the presence of animal urine so that the wetted litter can readily be separated and removed from unwetted litter, comprises clay granules which have, exposed on their surfaces, a layer or pregelatinized, cationic starch which is confined to the surfaces of the granules; the starch comprising between 0.2% and 2% of the weight of the litter. The layer of starch is effective to cause agglomeration of adjacent granules when wetted, but is such that the agglomerated granules will readily disagglomerate when placed in water, to allow flushability.

10 Claims, No Drawings

ANIMAL LITTER CAPABLE OF AGGLOMERATING

The present invention relates to animal litter such as is commonly placed in boxes or trays for use by cats and other pets.

It is well known that conventional animal litter, when wetted with urine, emits an objectionable odour, requiring that the whole of the litter or substantially the whole must frequently be replaced. Some litters are provided with chemical agents to reduce the odour or to mask it. Another solution which has gained in popularity recently is the use of litters which agglomerate when wetted. This agglomeration allows the selective removal of the part of the litter which has been wetted, by a suitable implement such as a scoop. This is of course much more economical in usage of litter than replacement of a whole tray or box.

One agglomerating litter which has been used is formed of so-called swelling type bentonite clay which occurs in Wyoming and elsewhere. This is a clay which naturally agglomerates into a gel, i.e. a pasty mass, when it has been wetted, and the agglomerate is easily removed from the unwetted litter. However, if the agglomerate produced is placed in water it will not disagglomerate, but rather will tend to absorb more water and swell. This makes it unsuitable for flushing down toilets, since there is the possibility that a large agglomerate could block the drain. Many householders like to be able to use a litter which is flushable.

Agglomerating litters which make use of more widely available materials are described in U.S. Pat. Nos. 4,638,763 (Greenberg) issued Jan. 27, 1987, and 4,685,420 (Stuart) issued Aug. 11, 1987. Greenberg describes an agglomerating litter which uses, as the basic material, minerals such as clays, silica, limestone, etc. or a cellulosic material such as sawdust or alfalfa. This is mixed with anhydrous sodium sulphate. Stuart describes an animal litter comprising a mix of a porous inert substrate such as wood chips, clay, etc. and a dry, particulate water absorbent polymer in an amount sufficient to agglomerate animal urine to thereby form a gelled agglomerate. Various rather special polymers are described in this Stuart patent which are said to be suitable for forming the gelled agglomerate. It is understood that this gelled agglomerate would be rather similar to the pasty mass which is produced with bentonite, and if this is so then the agglomerate would also not be suitable for flushing down toilets.

According to the present invention, an animal litter capable of agglomerating in the presence of animal urine so that the wetted litter can readily be separated and removed from unwetted litter, comprises clay granules which have, exposed on their surfaces, a layer of dry, pregelatinized, cationic starch which starch is confined to the surfaces of the granules, the starch comprising between 0.2% and 2% of the weight of the litter, the layer of starch being effective to agglomerate adjacent granules together when they become wetted. The starch layer is such that the agglomerated granules readily disagglomerate when placed in water so that the used wetted litter is flushable down a toilet.

It is to be understood that although starch is broadly a polymer, the pregelatinized cationic starch used in accordance with the present invention is not such as to form a gelled agglomerate as described in the Stuart patent. Rather, while the granules adhere together, they are rapidly dispersed if placed in water, as in a toilet.

According to another aspect of the invention, a process for making animal litter comprises mixing, in the absence of water, a dry granulated clay with between 0.2% and 2% by weight of dry powdered, pregelatinized, cationic starch in mixing or blending apparatus such that the starch is caused to form a layer on the surfaces of the granules, the litter so formed being flowable and unagglomerated when dry but being capable of agglomerating when wetted.

A preferred form of the invention will now be described.

The preferred form of clay is a fuller's earth obtained from the Red Lake area of British Columbia, Canada and sold by Western Industrial Clay Products Ltd. of Kamloops, British Columbia under the trade-marks "W. C. Cat" for cat litter and "CAN-DRY" for absorption of oil and grease. However, it is believed that other fuller's earth, and bentonite of the non-swelling type are suitable. The clay used has previously been crushed to a fairly small particle size, as compared to that normally used for cat litter, the particle size being smaller than 16 U.S. standard mesh (sieve opening 0.0469 inches) and preferably smaller than 20 U.S. standard mesh (sieve opening 0.0331 inches), but preferably larger than 40 U.S. standard mesh (sieve opening 0.0165 inches). The preferred size is about 30 U.S. standard mesh (sieve opening 0.0232 inches). The clay is mixed while substantially dry, i.e. having a moisture content of between about 3% to 14% by weight.

This clay is mixed with trom about 0.2% to 2% by weight of the dry finely powdered, pregelatinized, cationic starch. Preferred forms of starch are pregelatinized, cationic potato starches sold by A. E. Staley Manufacturing Company under the trade-marks STA-LOK 500 and 600. This is used dry, i.e. having its normal moisture content of 5.0%. The mixing is done in standard available apparatus such as a tumbling mixer, for example a rotating drum having internal mixing vanes somewhat similar to a cement mixer. Alternatively, the mixing can be done in a so-called ribbon blender, which is an apparatus having a series of parallel screw conveyors which move the material through a confined passage while mixing this. During the mixing, the cationic starch adheres to the clay forming a very thin layer of starch over the surfaces of the clay.

The product of this process is a fairly finely divided and readily pourable granular product useful as a litter; the layer of starch being so thin that it is not readily apparent. When the litter is wetted the starch forms a net providing sufficient adhesion between adjacent granules to allow the wetted part to be removed as a clump. Adhesion is not nearly so strong as in the gelled bentonite clay, so that a clump may break during removal; however, the agglomerating action is sufficient to allow the wetted clay to be fairly easily separated from the unwetted clay and removed. Accordingly, the terms "agglomerate" and "agglomerated" as used herein must be understood as including a fairly light adhesion which is nevertheless sufficient to allow removal of the wetted granules as one or several lumps. The adhesion between granules increases with time so that after a day or so the clumps are fairly firm. Adhesion also depends on the amount of starch used; although 0.2% may be sufficient it is more likely that at least 0.5% will be used.

The net formed by the wetted granules breaks up immediately when such granules are placed in water. This provides a clear distinction between the agglomerates formed with this invention and those using known bentonite clay, and means that the litter is readily flushable down a toilet and will not cause a blockage. Nevertheless, use of the litter in a septic tank system is not recommended since this would eventually fill up with a sand or mud like deposit resulting from the clay material.

The fact that, in accordance with the invention, the starch is confined to the surfaces of the granules distinguishes the litter of this invention from certain prior art litters in which starch is used as a binder for small granules of material to agglomerate these into pellets preferred for the litter. In such case, of course, the starch will be distributed through the pellets, rather than being concentrated on the surface to act as an agglomerating agent when the litter is used. Examples of such patents are U.S. Pat. No. 3,921,581 (Brewer), issued Nov. 25, 1975, U.S. Pat. No. 4,676,196 (Lojek et al.) issued June 30, 1987, and Canadian Patent No. 1,015,233 (Brewer) issued Aug. 9, 1977.

Furthermore, the fact that the layer of starch is exposed on the surfaces of the granules distinguishes the litter of this invention from litters described in U.S. Pat. Nos. 4,844,010 (issued July 4, 1989) and 4,881,490 (issued Nov. 21, 1989), both of Ducharme et al., in which starch may be used as a binder between particles of clay or the like and a nitrogenous compound absorber and would thus be covered by the latter material. Also, in the Ducharme patents, the starch binder is applied wet.

We claim:

1. An animal litter capable of agglomerating in the presence of animal urine so that the wetted litter can readily be separated and removed from unwetted litter, the litter comprising granules of clay selected from the group comprising fuller's earth and non-swelling bentonite type clays which granules have, exposed on their surfaces, a layer of pregelatinized, cationic starch which starch is confined to the surfaces of the granules, the starch comprising between 0.2% and 2% of the weight of the litter, the layer of starch being effective to agglomerate adjacent granules together when they become wetted; the starch layer being such that the agglomerated granules readily disagglomerate when placed in water so that the used litter is safely flushable down a toilet.

2. An animal litter according to claim 1, wherein the clay granules are between 16 U.S. standard mesh and 40 U.S. standard mesh in size.

3. An animal litter according to claim 1, wherein the starch comprises at least 0.5% of the weight of the litter.

4. An animal litter according to claim 1, wherein the starch is a pregelatinized, cationic potato starch.

5. A process for making animal litter comprising mixing, in the absence of water, a dry granulated clay selected from the group comprising fuller's search and non-swelling bentonite type clays, with between 0.2% and 2% by weight of a dry powdered, pregelatinized, cationic starch in mixing or blending apparatus such that the starch is caused to form a layer on the surfaces of the granules, the litter so formed being flowable and unagglomerated when dry but being caused to agglomerate when wetted.

6. A process according to claim 5, wherein the mixing is done in a tumbling mixer.

7. A process according to claim 5, wherein the mixing is done in a ribbon on screw conveyor type blender.

8. A process according to claim 5, wherein the clay granules are between 16 and 40 U.S. standard mesh in size.

9. A process according to claim 5, wherein the starch is a pregelatinized, cationic potato starch.

10. A process for agglomerating animal urine to facilitate removal of the urine from a litter box or tray, said process comprising contacting the animal urine with an animal litter in the box or tray, said animal litter comprising clay granules which have, exposed on their surfaces, a layer of pregelatinized, cationic starch which starch is confined to the surfaces of the granules, the starch comprising between 0.2% and 2% of the weight of the litter, the layer of starch being effective to agglomerate adjacent granules together when they become wetted; the starch layer being such that the agglomerated granules are readily disagglomerated when placed in water so that the used litter is safely flushable down a toilet.

* * * * *